Jan. 25, 1938.   O. U. ZERK   2,106,586
SPARE WHEEL AND TIRE COVER
Filed April 24, 1935   6 Sheets-Sheet 1
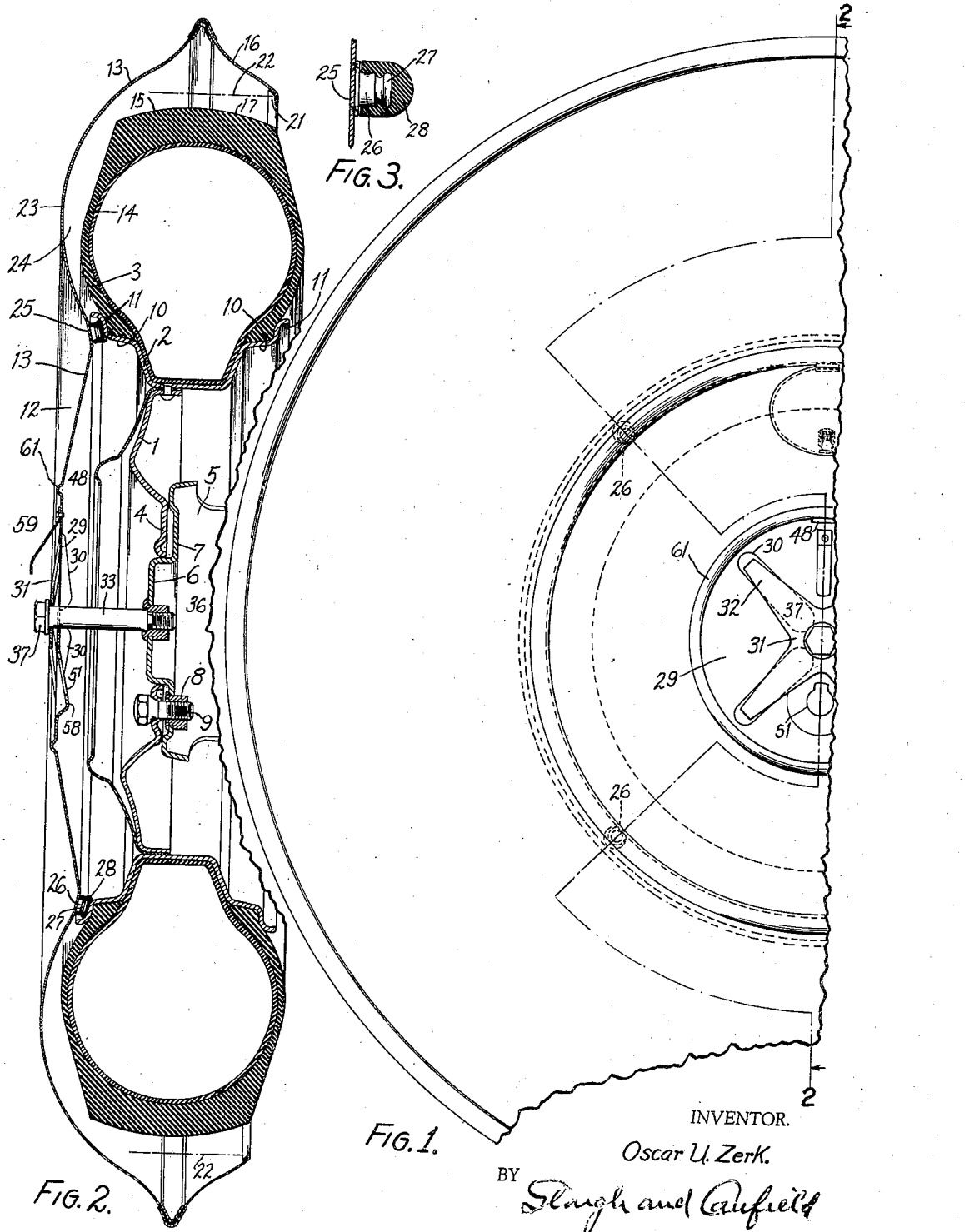
INVENTOR.
Oscar U. Zerk.
BY Slough and Caufield
ATTORNEY.

Jan. 25, 1938.                    O. U. ZERK                    2,106,586
                        SPARE WHEEL AND TIRE COVER
                          Filed April 24, 1935              6 Sheets-Sheet 2
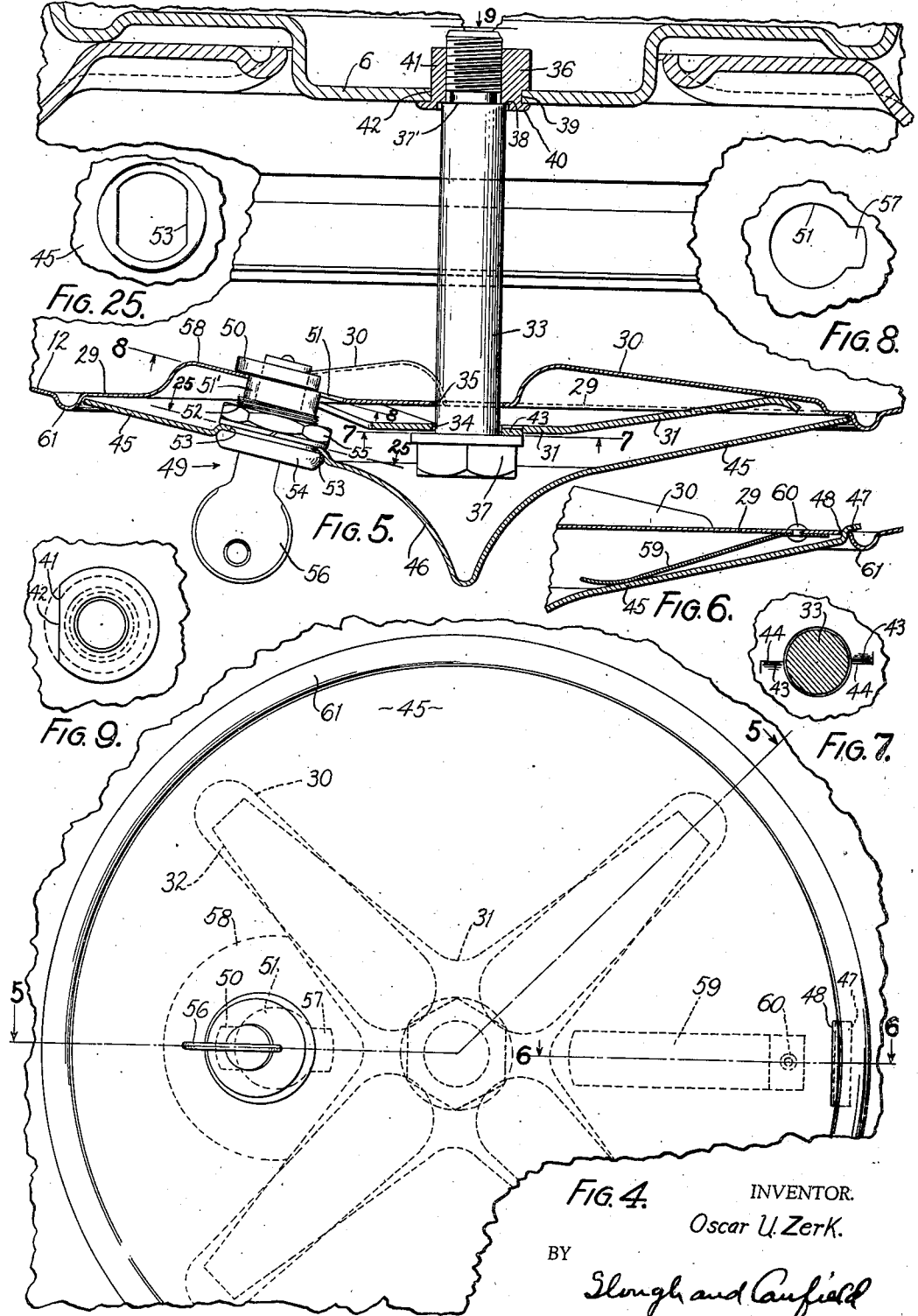
INVENTOR.
Oscar U. Zerk.
BY
Slough and Canfield
ATTORNEY.

Jan. 25, 1938.    O. U. ZERK    2,106,586
SPARE WHEEL AND TIRE COVER
Filed April 24, 1935    6 Sheets-Sheet 3

INVENTOR.
Oscar U. Zerk.
BY Slingh and Canfield
ATTORNEY.

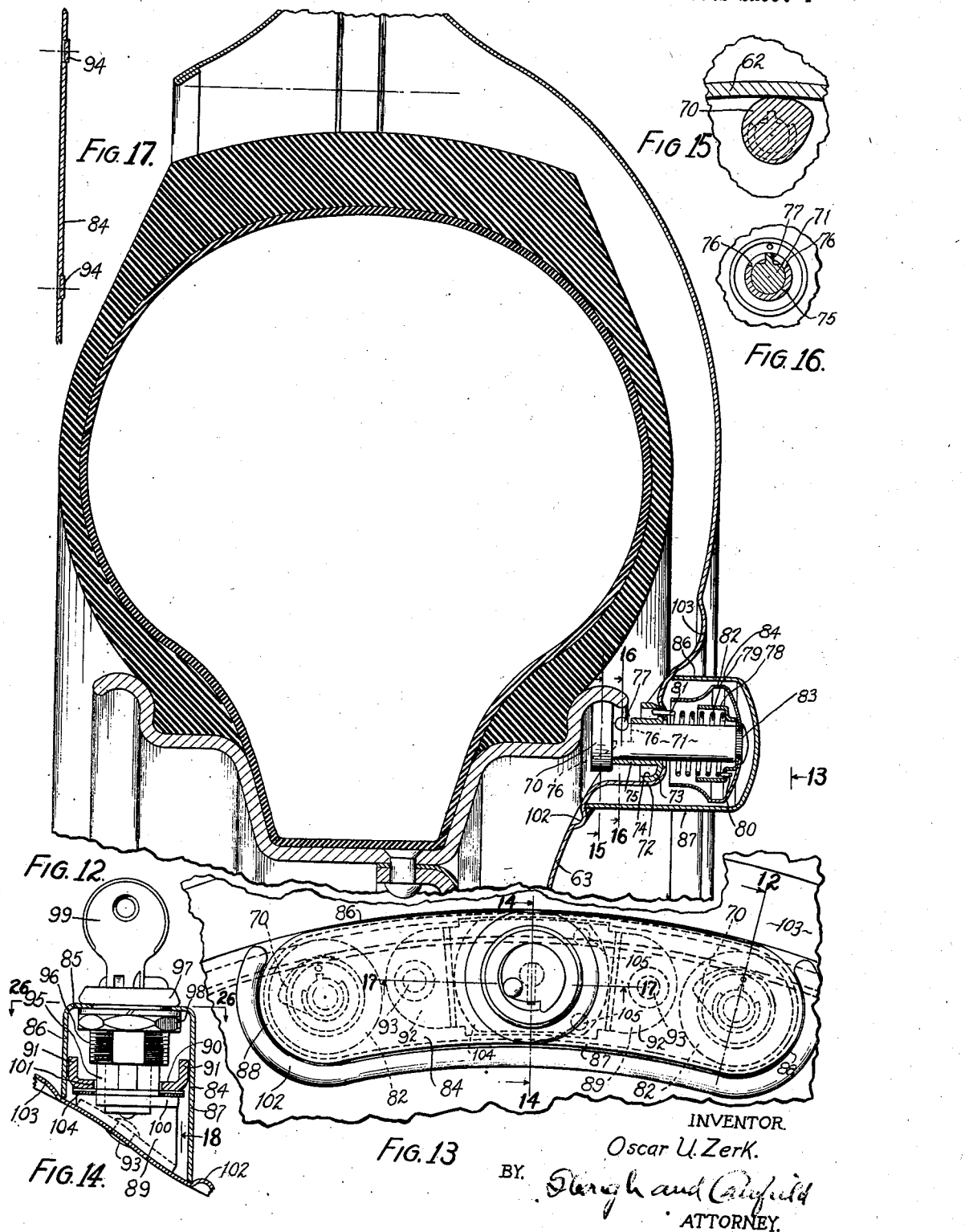

Jan. 25, 1938.  O. U. ZERK  2,106,586
SPARE WHEEL AND TIRE COVER
Filed April 24, 1935   6 Sheets-Sheet 5
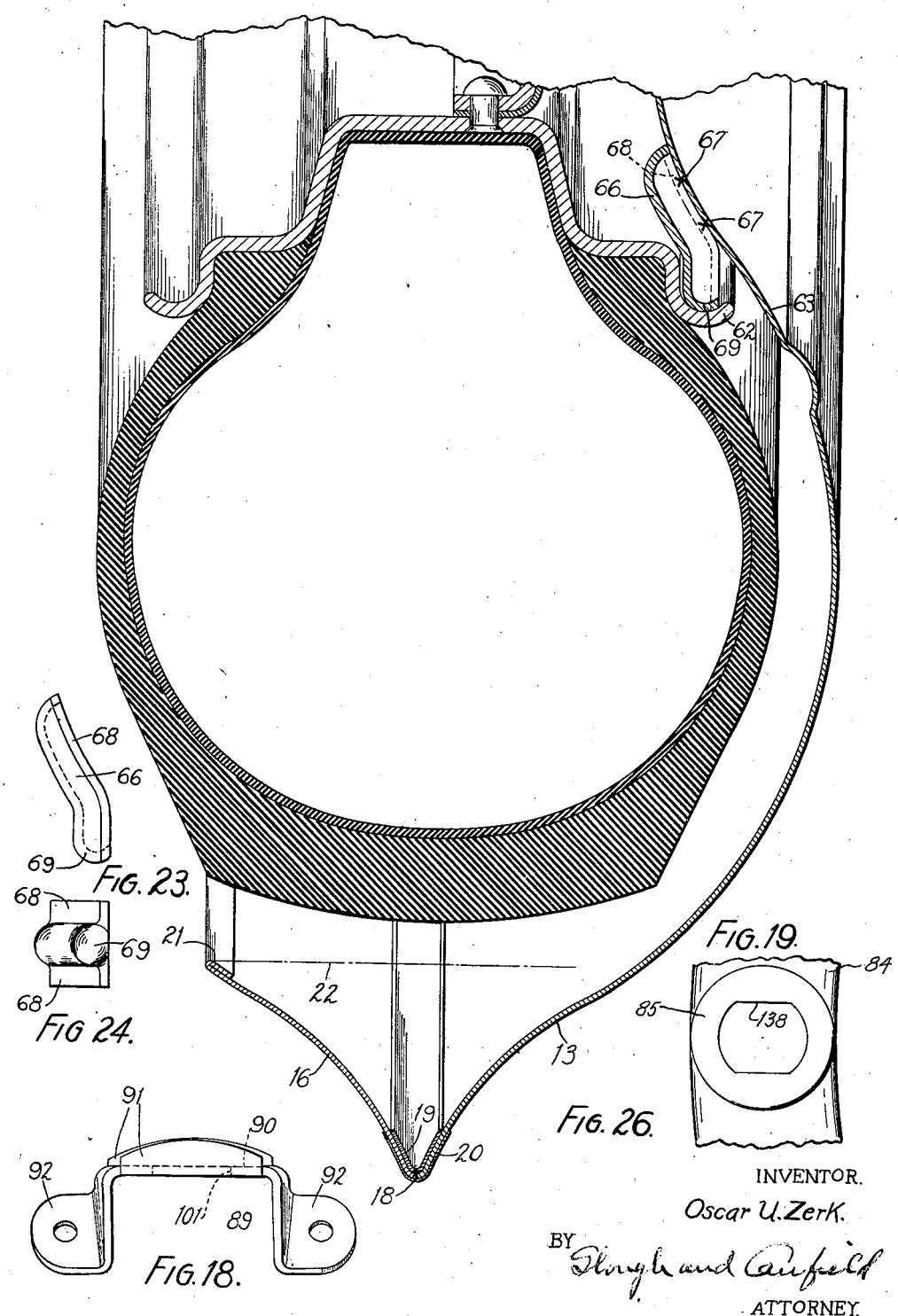
INVENTOR.
Oscar U. Zerk.
BY
ATTORNEY.

Jan. 25, 1938.  O. U. ZERK  2,106,586
SPARE WHEEL AND TIRE COVER
Filed April 24, 1935  6 Sheets-Sheet 6

INVENTOR.
Oscar U Zerk.
BY
ATTORNEY.

Patented Jan. 25, 1938

2,106,586

UNITED STATES PATENT OFFICE 2,106,586

SPARE WHEEL AND TIRE COVER

Oscar U. Zerk, Chicago, Ill.

Application April 24, 1935, Serial No. 18,015

8 Claims. (Cl. 150—54)

This invention relates to covers for the spare tires or the spare wheels and tires which are carried on the outside of automotive vehicles.

Covers have been proposed for the spare tire and wheel carried on the outside of an automotive vehicle, for example on the rear end thereof, but such prior covers have had several disadvantages. Some such prior covers have been made of flexible material such as fabric but these are unsightly and detract from the appearance of the modern streamlined vehicle.

Other prior art covers have been made of sheet metal and in order to secure them in tire-covering or tire-and-wheel covering position in a manner to prevent vibration and rattling thereof, they have usually been pressed against the tire itself; but because the tires with which such covers are used are not always of the same size, and again because the tire to be covered may be either a new tire or a worn tire, the securing means for the cover must allow for wide variations of tire dimensions. Springs have been used for such tire-engaging covers, but if the springs are designed to hold the cover on a small tire, they will exert too much force on a large tire and be difficult to operate; and if they are designed for a large tire, they will be loose and permit rattling and vibration of the cover or shifting thereof from the desired position when the tire is small.

Other prior sheet metal covers have employed a central fastening bolt or like screw means for drawing the cover into pressure engagement with the tire; but in such covers, if the screw means is designed to draw the cover into engagement with a small tire, it will, with a large tire, draw the center of the cover too far and deform or mutilate it.

Again, in other prior sheet metal covers, the cover has been secured rigidly to central portions of the wheel carrying the tire without engaging the tire but such covers vibrate and rattle in radially outer unsupported portions thereof or, in an attempt to avoid this difficulty, have been made of very thick sheet metal and therefore been undesirably heavy and cumbersome.

It is therefore an object of my invention to provide generally an improved construction of cover for the spare tire or spare wheel and tire of an automotive vehicle which will overcome the foregoing and other defects of prior covers.

Another object is to provide generally an improved securing and supporting means for covers of the class referred to.

Another object is to provide an improved cover of the class referred to which will be of improved quick detachable construction.

Another object is to provide a cover of the class referred to having means to support it on a spare wheel in position to cover the tire or the tire and wheel, by pressure engagement with portions of the wheel remote from the center.

Another object is to provide a cover of the class referred to having improved means to support it on a wheel out of contact with the tire thereon and in a manner to prevent vibration and rattling thereof.

Another object is to provide a cover of the class referred to having improved means to engage the cover with the spare wheel rim.

Another object is to provide a cover of the class referred to having improved means to support it on a wheel by resilient pressure engagement of portions of the cover with portions of the wheel rim.

Another object is to provide a cover of the class referred to having improved means to render the cover itself and the wheel and tire covered thereby, thief-proof.

Another object is to provide a cover for spare tires or spare wheels and tires having improved means for mounting and supporting the cover in covering position without contact thereof with the tire.

Another object is to provide a cover for spare tires or wheels and tires having improved supporting means engaging the spare wheel rim and constructed to compensate for variations in rim diameter and axial width thereof.

Another object is to provide an improved cover of the class referred to having improved means to conceal the cover supporting and securing means.

Another object is to provide a cover of the class referred to having a construction adapting it to be formed with pleasing contours and profiles, such as those provided by streamlining, and having quick detachable mounting means effectively concealed under the cover in a manner not to detract from the pleasing form thereof.

Other objects of my invention will be apparent to those skilled in the art to which the invention appertains.

My invention is fully disclosed in the following description taken in connection with the accompanying drawings, in which:

Fig. 1 is a rear elevational view of a cover embodying my invention, parts of the cover being broken away to simplify the drawing, and with a central cover portion or element removed;

Fig. 2 is a sectional view taken from the plane 2—2 of Fig. 1 illustrating the cover of Fig. 1, and the wheel and tire covered thereby and a part of the spare wheel supporting means, and one form of securing means for securing the cover in tire-and-wheel-covering position;

Fig. 3 is a fragmentary view to an enlarged scale of a part of Fig. 2;

Fig. 4 is a fragmentary view illustrating to a greatly enlarged scale the central portion of Fig. 1, illustrating the central covering element which is omitted from Fig. 1, the view being rotated through 90° clockwise with respect to Fig. 1;

Fig. 5 is a sectional view taken from the plane 5—5 of Fig. 4;

Fig. 6 is a fragmentary view taken from the plane 6—6 of Fig. 4;

Fig. 7 is a fragmentary view taken from the plane 7—7 of Fig. 5, illustrating a bolt lock means which I may employ;

Fig. 8 is a fragmentary view which may be considered as taken from the plane 8—8 of Fig. 5, with parts on and behind the sectional plane omitted for the sake of simplicity, illustrating a perforation which may be employed in connection with a locking means illustrated in Fig. 5;

Fig. 9 is a fragmentary view taken in the direction of the arrow 9 of Fig. 5;

Fig. 12 is a fragmentary view to an enlarged scale similar to the upper part of Fig. 11, but the view being taken from a plane indicated by the plane 12—12 of Fig. 13;

Fig. 13 is a fragmentary view to an enlarged scale of a part of Fig. 10, and the view may also be considered as taken in the direction of the arrow 13 of Fig. 12;

Fig. 14 is a fragmentary sectional view taken from the plane 14—14 of Fig. 13 with parts behind the section plane omitted for simplification;

Fig. 15 is a fragmentary sectional view taken from the plane 15—15 of Fig. 12 with parts behind the section plane omitted;

Fig. 16 is a fragmentary sectional view taken from the plane 16—16 of Fig. 12;

Fig. 17 is a fragmentary sectional view with parts behind the section plane omitted, the view being taken from the plane 17—17 of Fig. 13 and illustrating an alternative optional construction;

Fig. 18 is a view illustrating separately one of the elements illustrated in Figs. 13 and 14, and the view may be considered as taken in the direction of the arrow 18 of Fig. 14;

Fig. 19 is a view to an enlarged scale of the lower part of Fig. 11;

Figs. 23 and 24 are side elevational and end views respectively showing separately an element illustrated in section in Fig. 19;

Fig. 25 is a fragmentary view taken from the plane 25—25 of Fig. 5 with parts behind the section plane omitted for clearness and simplification of the drawings;

Fig. 26 is a fragmentary view taken from the plane 26—26 of Fig 14 with parts behind the section plane omitted for simplification.

Figure 10:
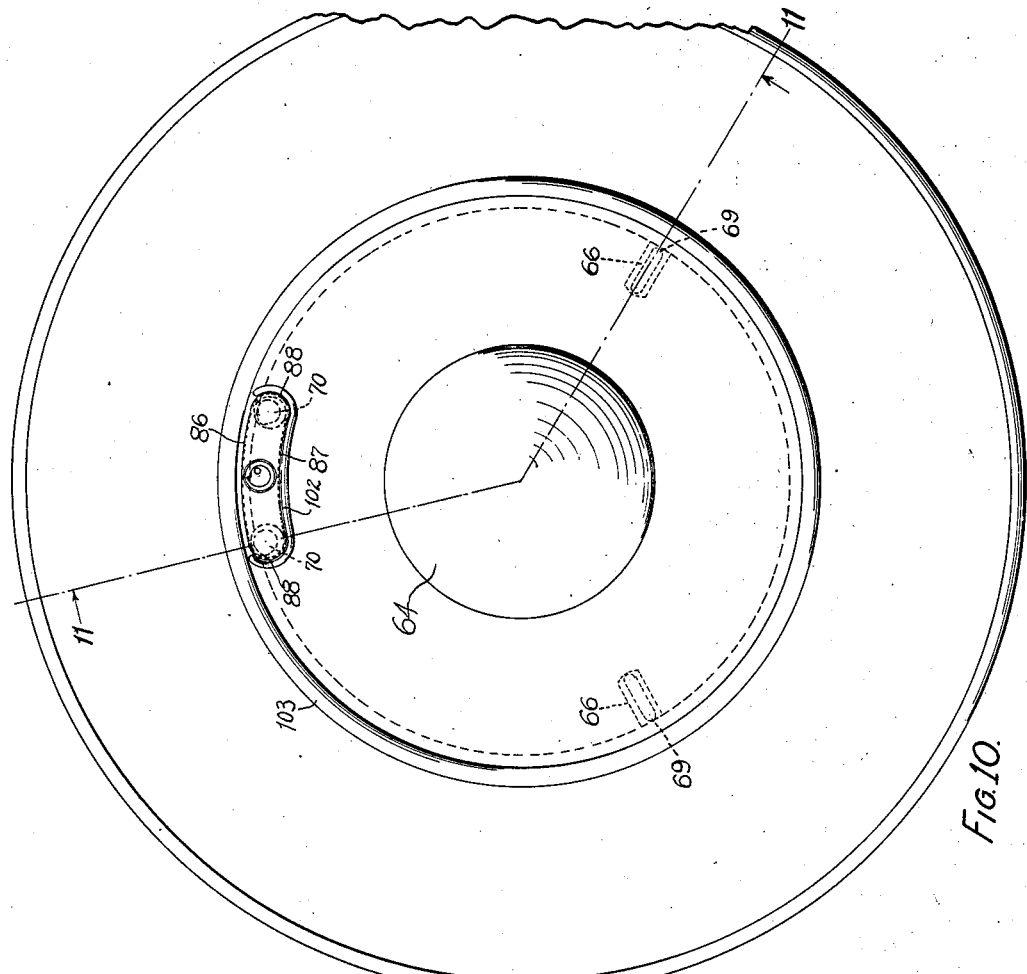
Fig. 10 is a rear elevational view illustrating another embodiment of my invention.

In the drawings, with particular reference to Figs. 1 to 9 inclusive which illustrate one embodiment of my invention, I have illustrated at 1 a spare wheel comprising a tire-carrying rim 2 upon which the tire 3 is mounted and having a central flange 4 by which the wheel is secured to a spare wheel carrier 5. The construction of the wheel and carrier constitutes no essential part of the present invention.

In the form illustrated, the carrier 5 has a central web portion 6 and an annular flange portion 7, the latter being provided with a plurality of threaded nut-like receptacles 8, and a plurality of bolts 9 are projected through perforations in the wheel flange 4 and threaded into the receptacles 8 to secure the wheel on the carrier, the wheel flange 4 having a central perforation telescoped over the web portion 6 of the carrier. The flange 4 of the wheel and the perporation through which the bolts 9 are projected may be the means by which the wheel is ordinarily attached to the vehicle in use.

The wheel rim 2 illustrated is of the form having, besides the annular flanges 10—10 upon which the annular beads of the casing 3 rest, outwardly concave rounded annular shoulders 11.

The cover is illustrated generally at 12 and comprises a one-piece sheet metal stamping 13, covering the wheel, including the rim 2, the rearward face 14 of the tire 3 and a portion 15 of the annular tire tread; and the cover comprises an annular sheet metal stamping 16 covering substantially the remaining portion 17 of the tire tread, the two sheet metal stampings 13 and 16 (see Fig 19) abutting each other at annular edge portions as at 18, and joined together by an annular band 19, preferably spot-welded to inner surfaces of the stampings 13 and 16. The juncture thus provided is preferably covered externally by a band 20 which is preferably of polished metal such as chromium-plated metal and of a color contrasting with that of the rest of the cover.

The stampings 13 and 16 and the joining element 19 and finishing element 20 are preferably so formed as to be, in cross-section as plainly illustrated in the drawings, of concave sided V form, to provide the outer periphery of the cover with a streamlined configuration.

The tire tread covering portion of the cover thus provided preferably extends entirely around the tire, i. e. is completely annular. The stamping 16 has a forwardly open opening 21 which has a larger diameter than that of the largest tire which it is to cover, so that the cover may be moved into tire-covering position by telescoping the perforation 21 over the tire by simple axial movement, the periphery of the perforation 21 moving along the direction indicated by the line 22.

The cover portion 23 covering the face of the tire 3 is preferably bulged rearwardly and is annular in form, and clears the tire 3 as shown at 24, Fig. 2. The central portion 13 of the cover also is preferably convex rearwardly, thus providing an annular channel portion 25 between the tire-covering portion and the central wheel covering portion. The channel portion 25 is preferably disposed axially opposite the annular shoulder 11 of the wheel rim above described.

On the inner side of the cover, at the annular channel portion 25, is secured a plurality such as four studs 26, annularly spaced and preferably spot-welded to the cover, the studs having heads 27 on the ends thereof, and rubber caps 28 are fitted over the heads 27 to secure them to the studs 26. In a manner presently to be described, the entire cover is pressed forwardly to compressibly seat the caps 28 upon the said annular shoulder 11 as shown in Fig. 2 whereby the entire cover is pressed in the axial direction toward and upon the wheel rim and with the tire-covering portion entirely out of contact with the tire.

To provide the axial thrust just referred to, the central part of the sheet metal stamping 12 is formed flat as shown at 29 and to strengthen the same is formed with a plurality, such as four, radially extending ribs 30—30 pressed in the flat sheet metal portion 29.

A four-arm or star-shaped flat sheet metal spring 31 is disposed with the ends of the arms 32 in the ribs 30 (see Fig. 5), and a bolt 33 is projected through aligned perforations 34 and 35 in the spring 31, provided at the center of the cover, and is threaded into a threaded nut-like receptacle 36 secured in the web 6 of the wheel carrier 5. Upon turning the bolt 33 by the head 37 thereof, the arms 32 of the spring 31 will be put under tension, and, by pressing upon the bottoms of the ribs 30, will exert inward axial thrust on the entire cover and compress the rubber caps 28 upon the annular shoulder 11 and thereby secure the cover upon the wheel as above described.

A cover thus constructed will fit and can be secured upon a number of wheels the rims of which are of variable diameter such as occurs in manufacture thereof, the rubber caps 28—28, for greater or lesser diameters of rim, resting on the shoulder 11 radially more outwardly or inwardly as the case may be; and the cover likewise will fit and be secured upon wheels the rims of which vary in axial width, such variations of manufacture being compensated partly by variable amounts of compression of the caps 28 and also by variable degrees of compression of the spring 31. Also, by providing ample clearance between the cover and the tire, the cover may be used with the largest or the smallest size tire that can be used with the rim 2.

The inner or threaded end of the bolt 33 is provided with a shoulder 37' which bottoms upon or in a recess 38 in the receptacle 36 whereby to insure that the spring 31 may be compressed sufficiently to provide the desired amount of axial resilient thrust on the cover and at the same time prevent the bolt 33 from being screwed in far enough to distort or deform the spring 32 or the central flat portion 29 of the cover. By this means, when the cover is mounted on the wheel, the bolt 33 may, in every case, be screwed up tight to engage the shoulders 37' and 38, leaving nothing to the judgment of the operator; and in every case, the cover will be securely pressed upon the wheel by the spring 31 and the cushioning caps 28 and in no case will the centrally applied pressure mutilate the cover.

The receptacle 36 is preferably secured to the web 6 of the carrier by projecting a neck 39 of reduced diameter through a suitable perforation in the web and riveting over the end thereof, as at 40, and to insure that the receptacle 36 may not be rotatively displaced upon screwing the bolt 33 into and out thereof, the receptacle is provided with a flat face 41 engaging with a corresponding straight portion 42 of the periphery of the perforation 39.

The bolt 33 may be prevented from loosening by unintended unscrewing thereof, by a plurality of such as two radial tongues 43—43 pressed axially outwardly from central portions of the spring 32, the sharp edges 44—44 thereof operating in the nature of a lock washer to prevent unscrewing rotation of the bolt 33 except upon the application of relatively great torque thereto by a wrench on the head 37.

In the preferred construction of cover, the flat ribbed portion 29 and the spring 32 and bolt head 37 are covered by a cap or cover element 45, shown in Figs. 4, 5 and 6. The cap 45 is preferably circular in rear elevation and the central portion thereof, in order to conform it to the streamlined configuration of the other parts of the cover, is formed as shown at 46, Fig. 5, to be concave conoidal. At the periphery of the cap, preferably upon the upper side thereof when mounted on a wheel as viewed in Figs. 1 and 2, a tongue 47 is formed from the sheet metal of the cap; and to secure the cap upon the cover, the tongue 47 is inserted inwardly through a perforation 48 in the flat portion 29 of the cover 12 and the cap is then hinged downwardly around the perforation 48 and the periphery thereof rests upon the flat portion 29. To secure the cap thereon, a latching device is provided, shown generally at 49, comprising a finger 50 which may be projected through a perforation 51 in the flat portion 29 of the cover and rotated to overlap the same inwardly as shown in Fig. 5.

The exact construction of the latching device is not an essential part of the present invention and may be variously formed and constructed. In the form illustrated, a barrel 51' is rotatably supported in a sleeve 52 which is secured to the cap 45 by being projected through an oblong perforation 53 therein corresponding to the form of the sleeve to prevent turning thereof in the perforation, and by clamping a portion of the cap adjacent the periphery of the perforation 53 between a head 54 and a nut 55. The finger 50 extends radially from the barrel 51' and may be rotated with the barrel by any suitable means in the form of a knob or handle exteriorly of the head 54.

In the form illustrated, the barrel 51' may be rotated by a key 56 inserted into the barrel and operating a tumbler lock of well known construction not shown. The perforation 51 may have the form shown in Fig. 8 and the finger 50 may first be inserted through the offset portion 57 of the perforation and then rotated to the overlapping position of Fig. 5. The perforation 51 may be formed in a depressed portion 58 of the flat part 29 of the cover as shown in Figs. 2 and 5.

By this construction the cap 45 is secured by the tongue 47 at one side and by the finger 50 at the other side thereof. To prevent looseness or rattling of the cover, a flat leaf-spring 59, Fig. 6, may be riveted as at 60 at one end thereof to the flat portion 29 of the cover, and the free end may press upon the inner side of the sheet metal cap 45.

When, as in the preferred construction, the latching device 49 is of the key-operated lock construction, when the cap 45 is secured in position as illustrated and described, it renders thief-proof, not only the cover itself, but the wheel and the tire which it covers, inasmuch as it prevents removing the cover by preventing access to the bolt 33 and the cover itself prevents access to the bolt 9.

Except for the advantages of rendering the parts thief-proof as just described, the latching device 49 may consist of a knob device in place of the key 56 for turning the barrel 51 and operating the finger 50.

To prevent forcibly removing the cap 45 when the latching device is of the key-operated lock type, an upstanding bead 61 may be provided in the nature of a fence around the periphery of the cap 45 and closely adjacent thereto which, besides adding to the generally streamlined configuration of the cover, will prevent the insertion of a screwdriver or like edged instrument under the peripheral edge of the cap 45 to pry it off.

In the form of my invention shown in Figs. 11 to 19 inclusive, I have illustrated at 1 and 2 a wheel and rim which may be of the same construction of the corresponding parts of Fig. 2, the rim having, as in Fig. 2, the rounded annular channel 62 common to rims of this class.

Figure 11:
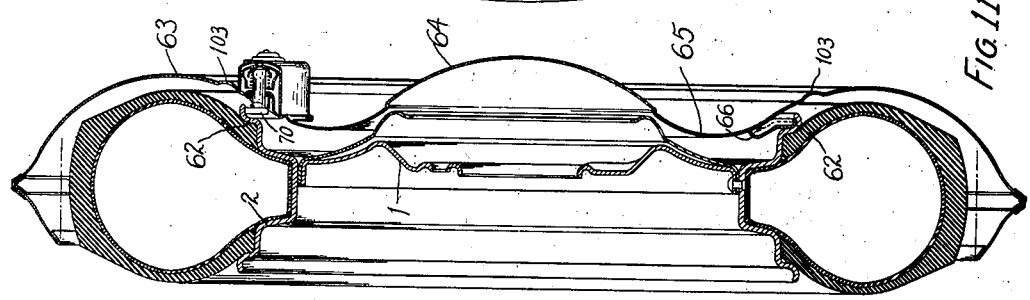
Fig. 11 is a sectional view taken approximately from the plane 11—11 of Fig. 10.

The cover indicated generally at 63 is generally of the same form as the cover of Figs. 1 and 2 in those portions covering the tire, but the central portion of the cover of Figs. 10 and 11 has a generally spherical integral portion 64 corresponding to the separate cap portion of the other form; and between the tire covering portion and the central portion 64, the cover has a relatively large radius channel portion 65.

Secured to the inner side of the sheet metal of the cover and circumferentially spaced apart at an angle of approximately of 120° is a pair of bracket elements 66—66 formed from pressed sheet metal and preferably spot-welded as shown at 67—67, Fig. 19, to the cover 63. The bracket elements 66 comprise each a flange or flanges 68—68 for spot-welding to the sheet metal cover and a generally radially outwardly extending finger portion 69. The bracket elements 66 are so formed and disposed upon the inner surface of the sheet metal cover that the ends of the finger portions 69—69 will rest in the annular channel 62 of the wheel rim when the cover is in the desired wheel and tire covering position, as shown in Figs. 10, 11 and 19. The other or upper portion of the cover is secured to the wheel rim by a cam or pair of cams 70—70 having means which will be described to force them into rim channel 62 at a portion thereof approximately 120° from each of the fingers 69.

Thus by means of the cams 70 and the fingers 69, the cover is engaged at three angularly spaced points with the rim channel 62 in a manner to secure the cover to the rim and support it thereon in spaced relation with respect to the tire and the other parts of the wheel as illustrated in Figs. 11 and 19.

The cams may be similarly constructed and operated and may each be secured to a shaft 71 and have a camming portion eccentric thereto as illustrated which is, upon rotation of the shaft, engageable with the channel 62. To rotatably support the shaft 71, the sheet metal of the cover (see Fig. 12) is pressed outwardly to provide a receptacle portion 72 in which is seated a sheet metal mushroom-formed element 73 having a head 74 by which it may be secured, for example by spot-welding, to the depressed portion 72 and having a sleeve-form stem 75 forming a sleeve bearing for the shaft 71.

The upper side, as viewed in Fig. 12, of the sleeve 75 is cut away to provide a pair of shoulders 76—76. The shaft 71, adjacent the cam 70, is provided with a tongue 77 extending radially therefrom, and provided by squeezing the metal of the shaft 71 outwardly radially, the tongue 77 permitting limited oscillation of the shaft 71 in the sleeve 75.

On the opposite end from the cam 70 the shaft has a thimble 78 secured thereto, and a coil spring 79 around the shaft has one end as at 80 anchored in the thimble and the other end as at 81 anchored in the cover or in the element 73. A knob 82 of sheet metal is telescoped over the thimble 78 and spring 79 to cover and conceal the same as well as the portion of the shaft 71 extending outwardly from the cover; and is secured, together with the thimble 78, by the end of the shaft 71 projected through coaxial perforations therein and headed over as at 83.

By this construction, upon turning the knob 82 in one direction against the tension of the spring 79, the cam 70 may be turned counterclockwise as viewed in Figs. 13 and 15 to disengage the cam 70 from the channel 62. Upon releasing the knob 82, the spring 79 may turn the cams in the other direction to engage them with the channel 62.

In the operation of the quick-detachable features of the cover thus far described, to apply the cover to the wheel and tire, the fingers 69 are placed in the channel 62 on the lower side of the wheel and then the upper side of the cover is rocked inwardly against the wheel. The operator then grasps the two knobs 82 and rotates them counterclockwise against their springs whereupon the cams 70 may pass the edge of the channel 62 by further inward rocking movement of the cover; then upon releasing the knobs 82, their springs will rotate the cams to cause them to engage with the channel 62 and cause the cover at all three portions thereof to grip in the channel to secure it to the wheel and support it thereon.

Any lost motion or looseness which may be present or which may tend to develop in use is automatically taken up by the springs 79 rotating the cams to more securely engage them with the channel, thus all looseness and rattling of the cover is automatically prevented. Similarly the springs 79 will rotate their cams to cause secure engagement with the channel on wheels of which the channel 62 may be of variable diameter.

Although I have shown two knobs 82 and two cams 70 operable thereby, it will be understood that a single cam may be employed, the duplicate cam being preferred for the sake of greater security.

Where it is not desired to render the attaching and detaching means of the cover above-described, thief-proof, the described construction will be all that is needed and the knobs 82 may be made ornamental. Where, however, the thief-proof feature is desired, the following construction may be utilized.

A cover element 84 press-formed from sheet metal and having generally the form of an arcuate cup is provided to completely cover the two spaced knobs 82. The outer face 85 of the cup may be in a plane parallel to the cover as a whole, the upper and lower side walls of the cup 86 and 87 may be curvilinear concentric with the center of the cover, and the end walls 88—88 may be rounded as shown in Figs. 10 and 13; and the upper and lower walls 86 and 87 may engage the outer face of the cover as plainly shown in Fig. 12 to entirely cover and conceal the knobs 82 and the parts associated therewith.

To secure the cover element 84 upon the cover, a bracket 89 comprising a web portion 90, upstanding flanges 91—91 and feet 92—92, preferably press-formed from relatively heavy sheet metal, is secured to the cover by rivets 93 projected through perforations in the feet 92 and in the cover and riveted over. A lock-operated latch (to be described) is provided to detachably secure the cover element to the bracket.

Inasmuch as the cover element 84 is optional, and therefore the riveting of the bracket 89 on the cover will be optional, the perforations for the rivets 93 will be optional, and the cover may be constructed as shown in Fig. 17 with partly punched offset knock-out discs 94—94 which present a generally unperforated cover surface when the bracket 89 is not to be used and which may readily be knocked out to provide the perforations when it is to be used. It will be understood that Fig. 17, being a section along the plane 17—17 of Fig. 13, illustrates this optional structure and not the rivets 93—93 of Fig. 13.

Any suitable lock construction may be provided, the form illustrated comprising a barrel 95 rotatable in a sleeve 96 which is rigidly mounted upon the outer wall 85 of the cover element by being projected through an oblong perforation 138 therein corresponding to the form of the sleeve to prevent turning of the sleeve in the perforation, and having a head 97 on one side and a nut 98 on the other side thereof. The barrel 95 may be turned by a key 99 operating lock tumblers or the like, and the inner end of the barrel 95 may have a latch finger 100 thereon. The web 90 has a perforation 101 therein which may be like that shown in Fig. 8 in connection with the other form of my invention, through which perforation the finger 100 may be projected and turned to overlap the inner side of the web 90 when the lock is key-operated as above referred to.

When the cover element 84 is thus applied in position to cover the knobs 82 as illustrated and the key 99 is operated and then removed, the cover element will be locked in position and thereby will prevent theft or unauthorized removal of the cover and thereby render the cover itself, as well as the tire and the wheel, thief-proof.

To further render the construction thief-proof, a bead 102 may be provided closely adjacent to the lower wall 87 and end walls 88 of the cover element 84 for entirely surrounding the cover element to prevent forcible removal of the cover element by the insertion of a screwdriver or like edged tool under the edge thereof. Preferably, a relatively wide bead 103, concentric with the cover center, is formed on the cover for aesthetic design or ornamental purposes, and it may function in connection with the bead 102 as just described, in which case the bead 102 will be coextensive with the lower wall 87 and end walls 88 only of the cover element 84.

It will be observed, in the construction above described, that the spring 79 around the cam shaft 71 will effectively prevent rattling of the shaft 71, thimble 78, knob 82, and the spring itself. In order further to insure that the cover element 84 may not rattle, a flat spring 104 may be provided between the web 90 of the bracket 89 and the finger 100; and if desired, the spring 104 may be riveted to the web 90 as shown at 105. By this construction, the spring 104 will exert an inward thrust on the entire cover element 84 when the finger 100 is turned to the locking position.

While I have shown the cover of Figs. 10 to 19 inclusive as secured to the wheel upon a groove of the radially outer part of the rim carrying the tire, it will be understood that my invention may be practiced with a groove located elsewhere on the wheel or upon suitably disposed recesses for receiving the finger 69 and the cam or cams 70.

In the foregoing I have described the method of applying this cover to the wheel and of course the method of removing it will be just the reverse, i. e. after inserting the key 99 and turning it, the cover element 84 may be removed and laid aside; then the operator, by grasping the two knobs 82, may turn them counterclockwise to withdraw the cams 70 from the channel 62, and then rocking the cover outwardly toward him on the fingers 69, the cover may be lifted to lift the fingers out of the channel and then moved axially away from the wheel and tire.

Figure 21:
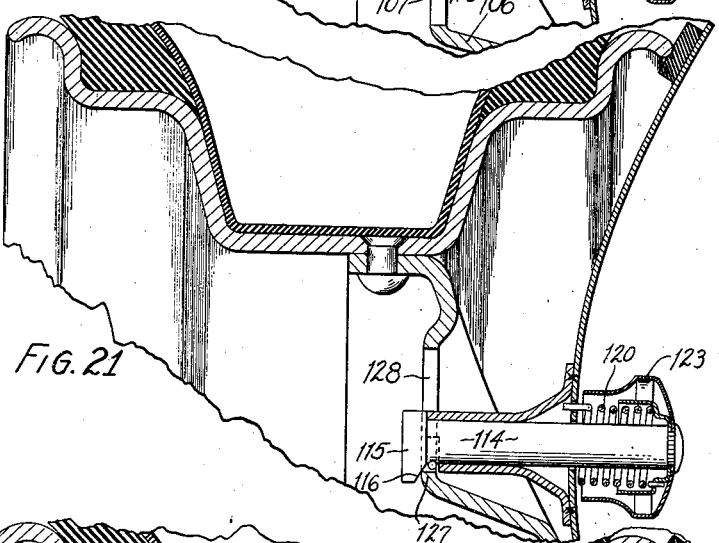
Figs. 21 and 22 are views similar in general to Fig. 20 but illustrating modifications.
Figure 22:
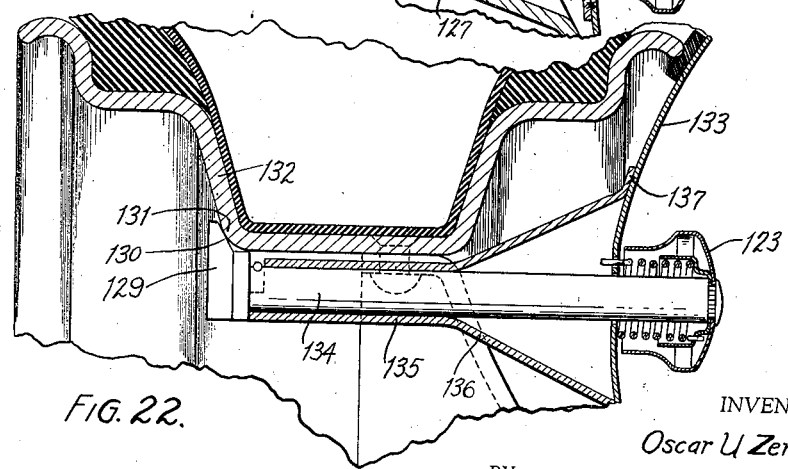

In this form it will be observed that there are no screw elements to be operated, and particularly in the form not employing the cover element 84, the entire cover is in a single piece. In the foregoing reference is made to a construction of cover not utilizing the channel 62 of the wheel rim and in Figs. 20, 21 and 22 are illustrated forms of cover having such attaching means.

Figure 20:
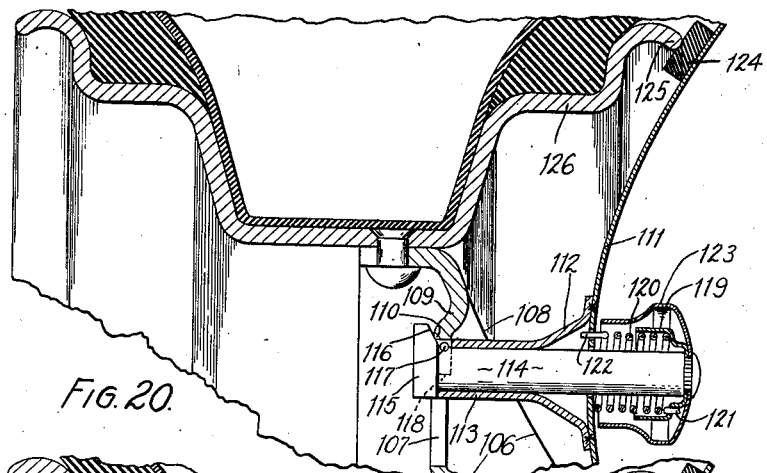
Fig. 20 is a fragmentary view illustrating still another embodiment of my invention, the view being in general the same kind of a view as Fig. 12.

In Fig. 20 is illustrated a construction which may be used with wheels having a central spoked portion 106 with perforations 107 between adjacent spokes 108 and a bridging portion 109 between the spokes providing shoulders 110 adjacent the radially outer portion of the perforation 107. The cover 111 has a thimble 112 secured, as by spot-welding, to the inner surface of the cover and formed with a tubular generally axially extending bearing portion 113 in which is rotatably mounted a cam shaft 114 having on the inner end thereof a cam 115 having an inclined or wedging cam face 116 engageable with the shoulder 110. The shaft 114 has a tongue 117 squeezed outwardly radially therefrom, engageable, in alternate directions of the shaft, with shoulders 118, only one of which is illustrated, formed on the inner end of the tubular bearing 113.

Upon the outer end of the shaft 114 is a thimble 119 in which is seated one end of a spring 120, the outer terminal of the spring as at 121 being anchored to the thimble 119 by being projected axially through a perforation therein, and the inner end as at 122 being anchored to the cover 111 by being projected through a perforation therein.

The spring 120 is formed to exert turning torque on the shaft 114 through the thimble 119, for example in the clockwise direction, and to exert outward axial thrust on the shaft 114 and cam 115.

A knob 123 generally of cup form is secured at the central portion of the bottom thereof upon the shaft 114 together with the thimble 119 by a construction and in a manner more completely described in connection with the form of Fig. 12.

In operation of the form of Fig. 20, the knob 123 may be turned counterclockwise to rotate the cam 115 to a position where it will project inwardly radially, or downwardly as viewed in Fig. 20, and then the cover may be positioned on the wheel and the cam 115 projected through the opening 107. The knob 123 may then be released and the spring 120 will rotate the shaft 114 and cam 115 and force the wedging cam surface 116 into wedging engagement with the shoulder 110 thereby drawing the cover inwardly axially toward the wheel with a wedging action, and preventing shifting thereof outwardly radially.

Cushioning rubber or like devices 124 may be secured to the inner surface of the cover 111 to engage a portion of the rim, such as the annular edge 125 of the rolled flange of the wheel rim 126, to tension the cover and to oppose the inward thrust on the cover of the spring 120 and of the wedging surface 116. On generally diametrically opposite portions of the cover from the cam 115, or at points spaced 120° in each direction from the cam, the cover may have thereon elements corresponding to the shaft 114 and cam 115 engageable with shoulder portions corresponding to the shoulder portion 110 to further position the cover. As will be understood, without further illustration, such elements may engage the corresponding shoulder portions if desired without rotation as will be understood without further description or illustration; or, the cushioning devices 124 may be relied upon to maintain the cover in position on the wheel and one or more rotatable shafts 114 and cams 115 may be provided solely to exert axial thrust on the cover.

In the form illustrated in Fig. 21, the shaft 114, cam 115 and wedging surface 116 thereof, together with a knob 123 and spring 120, are illustrated but with the cam surface 116 engaging a shoulder portion 127 on the radially inward peripheral portion of a perforation 128 instead of on a radially outward portion of the perforation as in the form of Fig. 20.

In the form illustrated in Fig. 22, a cam 129 having a wedging or camming surface 130 is provided to wedgingly engage when rotated a shoulder portion 131 of the wheel rim 132 on the side of the rim axially opposite the side covered by the cover 133. The cam 129 is provided on the inner end of a shaft 134, rotatable in a tubular bearing portion 135 of an elongated thimble 136 secured as by spot-welding at 137 to the inner face of the cover 133, and the shaft 134 and cam 129 may be turned by a knob 123 as described for the other forms.

Except for the differences above noted, the forms of Figs. 21 and 22 may be generally the same as that of Fig. 20.

In connection with the forms of Figs. 12, 20, 21 and 22, while I prefer to employ a torsion spring to automatically take up looseness and to automatically effect the wedging engagement described, this is not essential and the torsion action of the springs may be omitted and the wedging engagement may be effected manually by forced rotation of the cam shaft in each case.

My invention is not limited to the exact details shown and described. Many modifications and changes may be made therein within the spirit of my invention and without sacrificing its advantages, and within the scope of the appended claims.

I claim:

1. The combination with an automotive vehicle wheel of the type having a perforation therein, and a spare tire thereof, of a sheet metal cover for the wheel and tire comprising a central wheel covering portion, a plurality of spacing elements secured to the inner face of the cover and engageable with circumferentially spaced portions of the wheel rim and spacing the cover axially from all parts of the wheel and tire, a rotatable securing element comprising a wedge-shaped head projected through a perforation in the cover and through the wheel perforation and adapted to rotate to wedgingly engage with the edge of the perforation in the wheel to yieldably draw the cover toward the wheel to press the spacing elements upon the rim.

2. The combination with an automotive vehicle wheel of the type having a perforation therein, and a spare tire thereof, of a sheet metal cover for the wheel and tire comprising a central wheel covering portion, a plurality of spacing elements secured to the inner face of the cover and engageable with circumferentially spaced portions of the wheel rim and spacing the cover axially from all parts of the wheel and tire, a rotatable securing element comprising wedge-shaped head projected through a perforation in the cover and through the wheel perforation and adapted to rotate to wedgingly engage with the edge of the perforation in the wheel to yieldably draw the cover toward the wheel to press the spacing elements upon the rim, and resilient means to yieldably rotate the securing element to continuously effect the wedging engagement of the head with the edge of the perforation.

3. The combination with a spare wheel and tire of an automotive vehicle, of a sheet metal cover for the wheel and tire comprising a central wheel covering portion and a radially outwardly tire masking portion, spaced elements secured to the inner side of the cover engageable with the wheel rim, a securing element projected through the cover at a substantial distance from the wheel axis, and a camming portion on the inner end of the securing element engageable with a portion of the wheel upon rotation of the securing element to effect wedging engagement of the spaced elements with the wheel rim.

4. The combination with the spare wheel and tire of an automotive vehicle, of a sheet metal cover for the wheel and tire comprising a central wheel covering portion and a radially outwardly tire masking portion, spaced elements secured to the inner side of the cover engageable with the wheel rim, a securing element projected through the cover at a substantial distance from the wheel axis, a camming portion on the inner end of the securing element engageable with a portion of the wheel upon rotation of the securing element to effect wedging engagement of the spaced elements with the wheel rim, and resilient means to rotate the securing element and continuously effect the wedging engagement of the camming portion with the wheel.

5. The combination with a spare wheel including a rim having an annular channel formed therein and a tire of an automotive vehicle, of a sheet metal cover for the wheel and tire comprising a central wheel covering portion, spaced elements secured to the inner side of the cover having portions adapted to seat within the wheel rim channel, a securing element projected through the cover having a camming portion on the inner end thereof adapted to wedgingly seat within the rim channel upon rotation of the securing element, and the securing element being circumferentially spaced a substantial distance from the spaced elements whereby upon seating of the spaced elements within the rim channel and rotation of the securing element, the cover may be tightly clamped to the wheel.

6. The combination as described in claim 5 and wherein resilient means are associated with the securing element continuously urging the securing element to a rotated position engaging it with the wheel rim.

7. The combination as described in claim 5 and wherein a plurality of securing elements are provided each having an annularly operable handle portion projecting outwardly from the cover, and a single key operated cover means is provided for all of said handle portions preventing unauthorized manipulation thereof.

8. The combination with a spare wheel and tire of an automotive vehicle, of a cover for the spare wheel and tire comprising a central wheel covering portion and a radially outwardly tire masking portion, a plurality of securing elements projected through the cover and aligned perforations provided in the wheel at points spaced from the wheel axis, each of the securing elements having a wedging portion on the inner end thereof engageable with a peripheral portion of the wheel perforations, the securing elements being rotatable to draw the cover axially inwardly to engage the wheel rim, and operated cover means for securing elements preventing access thereto.

OSCAR U. ZERK.